June 28, 1960  J. C. NAVARI  2,942,638
ORANGE RIND GRATER

Filed Jan. 13, 1959  2 Sheets-Sheet 1

INVENTOR.
JULIUS C. NAVARI.
BY
Christy, Parmelee Strickland
ATTORNEYS.

INVENTOR.
JULIUS C. NAVARI.

United States Patent Office 2,942,638
Patented June 28, 1960

2,942,638

ORANGE RIND GRATER

Julius C. Navari, 163 Carver St., Pittsburgh, Pa.

Filed Jan. 13, 1959, Ser. No. 786,477

3 Claims. (Cl. 146—3)

My invention relates to apparatus for removing in comminuted form the skins or rinds of fruits and vegetables, and consists in certain new and useful improvements in apparatus for such purpose.

The object of the invention is to provide an apparatus which is more certain and efficient in service than existing apparatus for the purpose, and which is economical to construct and operate.

Apparatus embodying the invention is illustrated in the accompanying drawings, in which.

Figure 1:
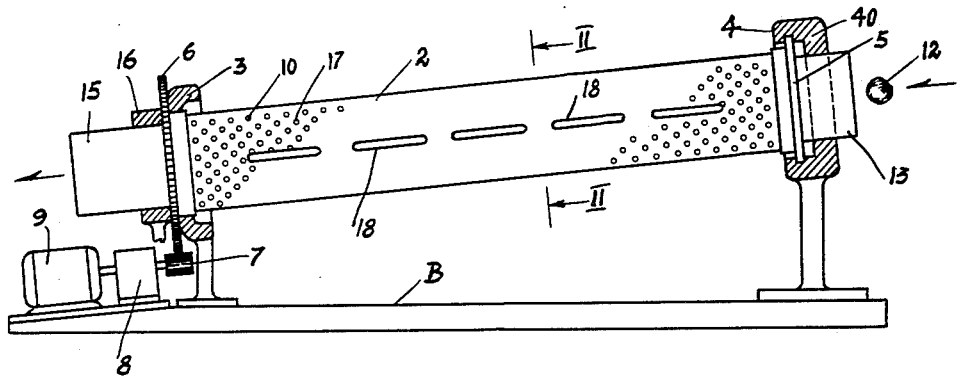
Fig. 1 is a view of the apparatus in side elevation.
Figure 2:
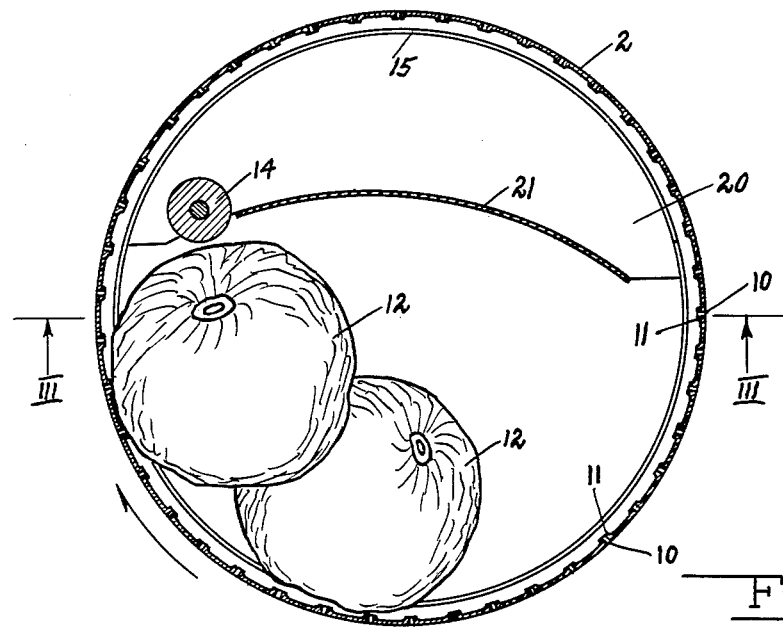
Fig. 2 is a sectional view of a certain grating drum of the apparatus, as seen on the plane II—II of Fig. 1 and shown to larger scale.
Figure 3:
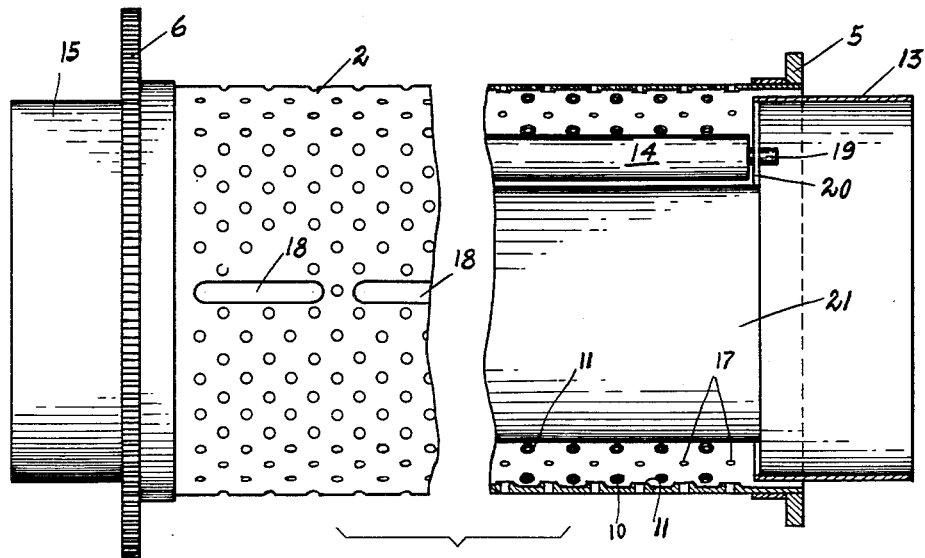
Fig. 3 is a fragmentary view showing the grating drum of the apparatus partly in side elevation and partly in horizontal section on the plane III—III of Fig. 2, the view of Fig. 3 being on somewhat smaller scale than Fig. 2.

Referring to Figs. 1 to 3 of the drawings, the apparatus comprises an elongate drum 2 which may be substantially horizontal or inclined at an angle, say from two to five degrees, more or less, to the horizontal. The drum is mounted for rotation in bearings 3 and 4. The drum may be formed of sheet metal, say stainless steel or other non-corrosive metal, and the drum carries a collar 5 at its upper end that forms the journal for the bearing 4, and at its lower end the drum has affixed to it a gear 6 driven by a pinion 7 that may be rotated through a gear-box 8 by an electric motor 9. The bearings, gear-box and electric motor may be supported on a base B.

The internal surface of the drum is provided with grating means for peeling or grating away the skins or rinds of vegetables and fruits introduced to the rotary drum. In the ensuing specification and claims oranges will be referred to as the produce which may be processed in the apparatus, but it will be understood that other approximately spheroidal fruits and vegetables are intended by the words "orange and oranges."

Figure 4:
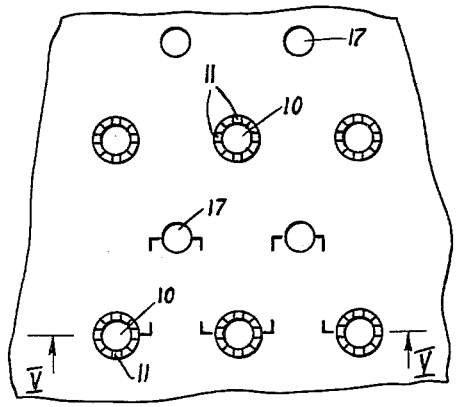
Fig. 4 is an enlarged view in side elevation of a fragment of the wall of the grating drum of the apparatus.
Figure 5:
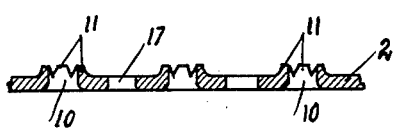
Fig. 5 is a sectional view of the fragmentary showing of Fig. 4, as seen on the irregular plane V—V of Fig. 4.

The grating means may be formed by punching holes 10 inwardly through the wall of the drum 2, thereby forming on the internal surface of the drum sharp tangs 11, as will be understood upon considering Figs. 3 to 5.

Oranges 12 are fed into the drum through an inlet in the form of a stationary tube or sleeve 13 rigidly supported in portion 40 of the bearing 4. The drum rotates in the direction of the arrow in Figs. 1 and 2, and this means that the surface portion and the grating means on one side of the drum (the right-hand side, Fig. 2) move upwardly, while the surface portion and the grating means on the opposite or left-hand side of the drum move downwardly. Upon entering the drum the oranges resting on the internal grating surface of the drum 2 rise in the direction of the arrow in Fig. 2, until they come against a stop that comprises a roller 14 which is free to turn on a stationary axis. The roller 14, as illustrated in the drawings, extends longitudinally and eccentrically of the axis on which the drum rotates, and it is important to observe that the roller 14 is located adjacent to the side wall portion of the drum that is moving upwardly, whereby the roller provides a rotatable stop which prevents the rise of the oranges to a level substantially above the axis or the horizontal mid-place of the drum. As the oranges abut against the roller 14 the tangs 11 on the internal surface of the drum rasp and grate away their rinds; it being noted that the roller 13 permits the oranges slowly to revolve as their rinds are being removed, thus insuring that the grating action will be effective over the entire surfaces of the oranges and not restricted to, or unduly concentrated on, relatively small areas of the surfaces of the oranges. As the oranges revolve and their rinds are grated they advance from right to left (Fig. 1) in the downwardly inclined drum, and upon reaching the lower end of the drum, they are discharged through a stationary outlet tube or sleeve 15 that is rigidly supported in a standard 16.

The length of the drum 2 is so determined by test that, as the oranges reach the lower end of the drum, their rinds will have been removed to the desired degree.

The liquids and raspings yielded by the oranges may escape from the drum by way of the tang-forming holes 10 provided in the wall of the drum. In addition to the tang-forming holes 10 plain holes 17 may be drilled or punched for affording greater freedom of escape for the liquids and raspings. Also, the wall of the drum includes relatively large openings or slots 18 for the discharge of the raspings or comminuted material grated from the surfaces of the oranges. Any convenient pan or other receptacle may be set beneath the drum to collect the discharged material.

The roller 14 extends longitudinally throughout the effective length of the drum 2, and carries at its right-hand end a journal 19 (Fig. 3) that is borne by a flange 20. The flange 20 is integral with the stationary inlet tube 13. It will be understood that at the left-hand end of the drum a similar flange (20) is rigidly carried by the outlet tube 15 for rotatably supporting a journal (19) at the left-hand end of the roller. It will be perceived in Fig. 2 that the roller 14 is located adjacent to the wall of the rotating drum on its "rising" side. In order to guard against the oranges overriding the roller, a cooperating stationary baffle plate 21 is provided. The baffle plate extends along the effective length of the drum and is supported at its ends by the flanges 20. If an orange should override the roller 13 the baffle plate 21 will deflect the orange downwardly and keep it in the lower half of the drum.

Figure 6:
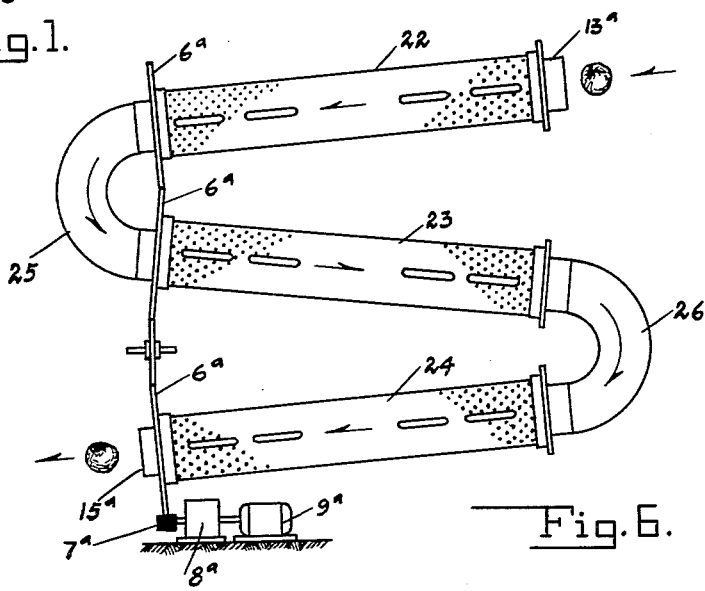
Fig. 6 is a view in side elevation of a modification or elaboration of the apparatus of the invention.

If the length of the drum 2, required for processing tough-skinned produce, is so long as to be impractical the drum may be formed in a plurality of sections, for example three sections, as shown in Fig. 6. The three drum sections or drums 22, 23, and 24 are inclined, as shown, and it will be understood that each section may be constructed, and may be mounted for rotation, and may include the roller and baffle plate, as described in the structure of Figs. 1 to 5. At the upper end of drum 22 an inlet tube 13a is provided, and at the lower end of drum 24 an outlet tube 15a is provided, while the successive intervening ends of the three drums communicate, as by way of rigidly supported hollow elbows or arcuate tubes 25 and 26. The gears 6a of the several drums are intermeshed, as shown, whereby the three drums may be rotated in unison by a pinion 7a, gear-box 8a and motor 9a.

Oranges introduced through inlet tube 13a are processed through drum 22, whence they pass under the effect of gravity through elbow 25, drum 23, elbow 26 and drum 24 to the outlet tube 15a. The apparatus described may, it will be seen, be readily adapted for the treatment of the various types of produce to be peeled or grated.

Within the intent of the appended claims many modifications and elaborations of the structure described may be made by the engineer or mechanic.

I claim:

1. Apparatus of the class described comprising a substantially horizontal rotary drum having grating means on its internal surface for the removal of the rinds of oranges introduced to the drum, means for rotating said drum on its longitudinal axis, with the effect that the surface portion and the grating means on one side of said drum move upwardly while the surface portion and the grating means on the opposite side of the drum move downwardly, a stop comprising an elongate roller in said drum extending longitudinally and eccentrically of said axis of the drum, and means for rotatably supporting said roller adjacent to said upwardly moving surface portion of the drum for limiting the upward movement of the oranges whose rinds are being grated when the drum is in rotation.

2. Apparatus of the class described comprising a substantially horizontal rotary drum having grating means on its internal surface for the removal of the rinds of oranges introduced to the drum, and having ports for the discharge of grated rind material from the drum, means for rotating said drum on its longitudinal axis, with the effect that the surface portion and the grating means on one side of said drum move upwardly while the surface portion and the grating means on the opposite side of the drum move downwardly, a stop comprising an elongate roller in said drum extending longitudinally and eccentrically of said axis of the drum, and means for rotatably supporting said roller adjacent to said upwardly moving surface portion of the drum for limiting the upward movement of the oranges whose rinds are being grated when the drum is in rotation.

3. Apparatus of the class described comprising a substantially horizontal drum having grating means on its internal surface for the removal of the rinds of oranges introduced to the drum, means for rotating said drum on its longitudinal axis, with the effect that the surface portion and the grating means on one side of said drum move upwardly while the surface portion and the grating means on the opposite side of the drum move downwardly, a stop comprising an elongate roller in said drum extending longitudinally and eccentrically of said axis of the drum, and means for rotatably supporting said roller adjacent to said upwardly moving surface portion of the drum for limiting the upward movement of the oranges whose rinds are being grated when the drum is in rotation, together with a transverse stationary baffle mounted within and extending longitudinally of said drum for cooperation with said roller in retaining the oranges in the lower portion of the rotating drum.

References Cited in the file of this patent

UNITED STATES PATENTS

| | | |
|---|---|---|
| 493,065 | Campbell | Mar. 7, 1893 |
| 1,075,222 | Powell | Oct. 7, 1913 |
| 1,714,367 | Hileman | May 21, 1929 |
| 2,166,652 | Zinsser | July 18, 1939 |
| 2,355,405 | Vucassovich | Aug. 8, 1944 |
| 2,563,458 | Dolbey | Aug. 7, 1951 |